Oct. 30, 1934.    E. S. CORNELL ET AL    1,979,099
BUS SUPPORT
Filed Sept. 18, 1930    2 Sheets-Sheet 2

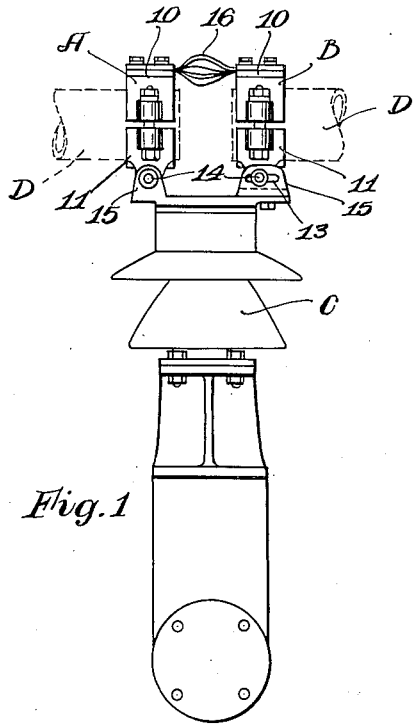
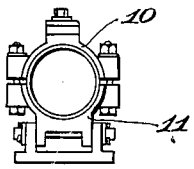
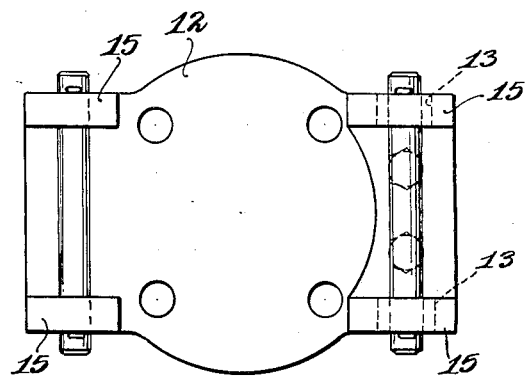
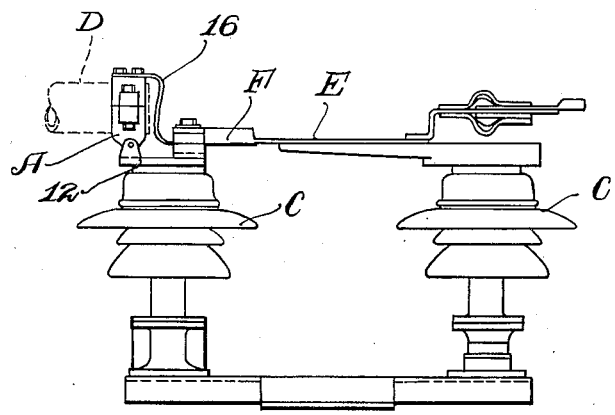

Inventor
Elias S. Cornell
Manfred Stewe
By
Attorney

Patented Oct. 30, 1934

1,979,099

UNITED STATES PATENT OFFICE 1,979,099

BUS SUPPORT

Elias S. Cornell and Manfred Stene, Chicago, Ill., assignors to Delta-Star Electric Company, Chicago, Ill., a corporation of Illinois Application September 18, 1930, Serial No. 482,795

8 Claims. (Cl. 173—251)

This invention relates to bus supports where long bus spans are required and where a reduction of insulator stacks is accomplished, providing economy of construction and greater strength.

These bus supports are particularly adapted to be used with hot galvanized iron pipes in the bus spans which have the advantage over copper tubing of providing greater strength without the increased weight and requiring less insulator stacks to support the same. The diameter of tubing required to resist excessive deflection in the span is usually such that the cross sectional area is more than sufficient to carry the current, even though iron is used. Heretofore while the use of such large busses effected economies, they have not been widely used because of the difficulty in making mechanical connections to the bus supports and electrical connections across sections. We accomplish this by our bus supports which constitute means of eliminating the former objections in a simple and economical manner.

A feature resides in a bus support wherein the bus span terminates on a support in a typical two-way support, and in no case does the pipe run continuous past the support. The electrical connections are made by simple flexible braided copper connections as will be hereinafter pointed out. Our bus support simplifies the problem of thermal expansion and contraction of the busses as well as expansion and contraction caused by deflection from ice and wind load. The ends of the busses are clamped in saddles which are hinged on a casting bolted to the insulator cap which insures free deflection of the span. Expansion and contraction is taken care of at one end of the span only, by means of a slotted opening in one of the hinge brackets. This provides that each span will be dead ended on one support, while the other end is free to move back and forth in the slotted hole.

A further advantage of our bus support resides in that it may be used when it is desired to dead end one end of a span on a disconnecting switch located at the end of the bus run. Further, by the use of our bus support the switches need not be originally installed, but can be added later if desired. There are times when it is required to have disconnecting switches inserted in the bus run for sectionalizing process, and this we can accomplish as will also be more fully hereinafter pointed out. The space may be provided and a jumper may be inserted and this may be removed at any time and switch contacts bolted to the adapter casting so as to support the switch end. The switches for this purpose are usually of the horizontal double break per phase type and the contact for these switches may be readily bolted to the adapter casting. Where switches of this type are provided for it is understood that the other end of the spans dead ended on switch stacks have the slotted hole to provide for expansion and contraction.

The simple construction of our bus support is provided by clamping members which are in two halves, the hinge portion being usually of malleable iron, whereas the other half is of bronze or a suitable material in order to obtain low resistance electrical connections. The application of these clamps is not hindered by span length or diameter, neither are they limited to use with iron pipes, although they will usually be used in this manner owing to the advantages and reasons hereinbefore stated.

A further advantage in the use of large bus construction of this kind in the hot galvanized iron pipe, is that the busses may be planked over during construction, and adjustments of all equipment attached to them made without setting up dangerous bending stresses in the supporting insulators. This is a material advantage over the bus supporting structures as employed heretofore.

We will endeavor to point out the best embodiment of our bus support together with the advantages and other objects in the specification and claims.

In the drawings forming part of this specification:

Figure 1 is a side elevation of a typical two-way support with the bus span terminating on the support and connected by the flexible copper braid.

Figure 2 is an end view of the bus support illustrated in Figure 1, however, not showing the insulator.

Figure 3 is a plan view of the base plate of the support.

Figure 4 illustrates a side view, illustrating the use of the support at a dead end on a disconnecting switch limited at the end of the bus run.

Figure 5:
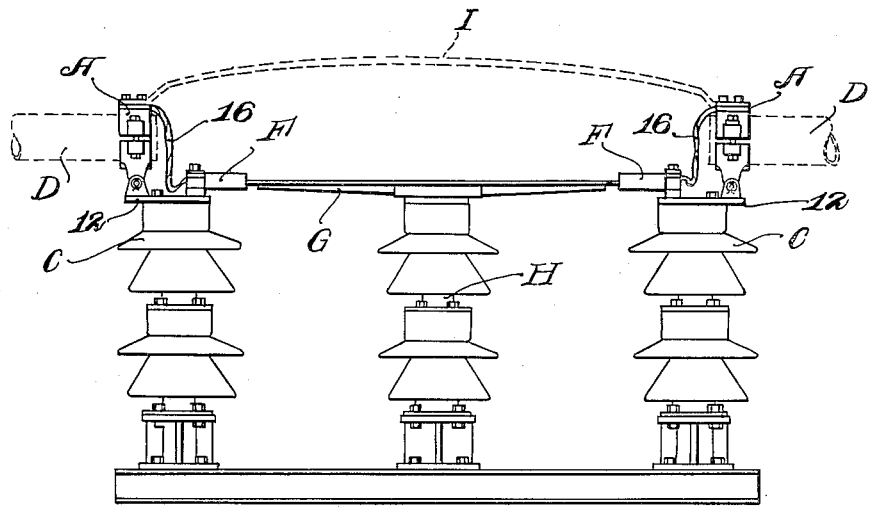
Figure 5 is a side view showing our bus support in use with a horizontal double break switch, and in dotted outline a jumper, which, of course, is removed when the switch is used. The jumper may be applied when the switch is out of use or before the switch is installed.

The drawings illustrate our bus supports A and B as illustrating their use in Figure 1, where a typical two-way support shows each end of a bus span where it terminates on a single support carried by the insulator C.

The bus supports A are formed in two halves, the upper portion 10 and the lower portion 11, which are bolted together over the bus pipe D illustrated in dotted outline in Figure 1.

The bus supports A and B are adapted to be attached to the base plate 12 to hingedly support the same at 14. A suitable slot 13 is provided in one of the supporting ears 15 of the base plate 12 so as to permit the expansion and contraction of the bus D to take care of the ice and wind load and expansion and contraction of the same. A copper braid connector 16 connects the ends of the bus as illustrated in Figure 1.

The base plate 12 of the bus supports A and B may be made with one set of supporting ears 15 on one side, or with a double set on each side. The double set of ears is illustrated in Figures 1 and 3, while we have illustrated a single set of ears on the bus supporting base in Figures 4, 5 and 6. The extra set of ears, so as to provide a double support like in Figures 1 and 3, may be of an integral construction or they may be attached by bolting or otherwise fastening the same to the base 12.

The bus supports A and B are identical in construction excepting we have designated the bus support B in Figure 1 to designate the support which carries the end of the bus D for expansion and contraction.

The two halves 10 and 11 of the bus supports A and B are hingedly supported at 14 and this provides the necessary hinging movement to readily support the bus members D in a manner to take off the strain from the insulator C. Where iron pipe busses D are employed which are preferably hot galvanized, they provide great strength and with our bus supports A and B such a bus is feasible. With connections insofar as we know used heretofore for bus supports it was not possible to use iron pipes for the bus members D. Our connector accomplishes these results and provides the necessary supporting and clamping means for the ends of the bus members D together with the flexibility and the insulator both for the hinging and the expansion and contraction of the bus members D.

A disconnect switch may be used at the end of the bus run D as illustrated in Figure 4 and here we have illustrated a disconnecting switch E which rotates to disconnect from the contact member F which is bolted to the base plate 12 in place of one of the sets of ears 15. This shows a very practical adaptation of our bus support A in connection with a switch E.

Figure 6:
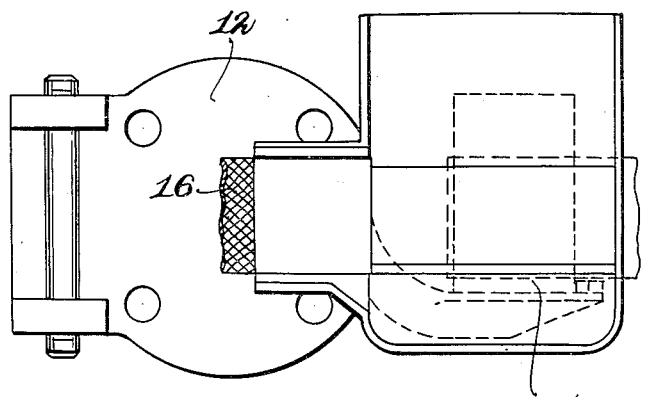
Figure 6 is a plan view of the base plate used with our support showing the contact connection for the disconnect switch as used in Figure 5.

Figure 6 shows a plan view of the contact F for the switch end of a disconnect switch such as G illustrated in Figure 5. In the horizontal double break type of switch G illustrated in Figure 5, a rotatable central supporting stack H is provided for carrying the switch G. When the bus runs are used as illustrated in Figure 5 with the bus members D connected by our support A they are supported by the insulator C as illustrated and the horizontal double break disconnect switch G may be provided. The other ends of the bus members D are adapted to be supported by the connector or bus supports B where the supporting ears 15 are slotted with the slots 13 to permit for the expansion and contraction of the bus run. The switch blades of the switch G operate in the contact plates D which are bolted to the base portions 12. It will be clearly apparent that a structure of this nature is very practical having a strong durable formation and arrangement of the parts which provide for the flexing of the bus members D and expansion and contraction so as to take any undue strain off of the insulator C.

The switch G may not be inserted at the time of insulation of the bus run D and in such a case where the switch G is not employed but where it may be contemplated for use later on, the necessary space is provided as illustrated by Figure 5 and the jumper I which is illustrated in dotted outline is connected across between the bus supports A. When the switch G is installed the jumper I is removed.

The advantages of our bus support will be quite apparent from the foregoing disclosure and it may be readily realized that where bus runs may be made of galvanized iron pipe they will have a very sturdy construction without undue weight, like where copper or other heavy metal is used, and owing to their size they will be equally adapted to carry the electrical loads and our supports will prevent any undue strain or breaking down of the insulators C. The adjustable nature of the bus supports A and B to permit their adaptations in different manners as set forth, accomplishes results which have been desired in high tension electrical bus supports which we believe are a primary advancement in the art, having economy of construction and durability with insulator protection.

In accordance with the patent statutes we have endeavored to set forth the best embodiment of our bus support and while the illustrations show certain adaptations and structures we desire to have the same understood within the scope of the following claims.

We claim:

1. A bus support including, a base supporting plate adapted to be attached to an insulator support, a lower clamping member pivotally supported to said base, an upper clamping member, bolts for connecting said upper and lower clamping members about a tubular bus, a second clamping member having lower and upper clamping portions, bolts for connecting said portions together over a bus end, the lower portion of said second clamping member for the bus having a pivotal and slidable connection with said base.

2. A bus support including, a base plate adapted to be connected to an insulator support, clamping members for the ends of bus members, and means for hingedly connecting said clamping members to said base plate slidable longitudinally with said bus members to support bus members for hinging and expansion and contraction movement on an insulator.

3. A bus support including, a base plate adapted to be attached to an insulator, ears formed on said base plate, a bus clamp adapted to be pivotally supported by said ears, a removable pair of ears for a second bus clamp supported by said base, having a slotted connection to hingedly and slidably support a second bus clamp thereto.

4. A bus support including, a base plate adapted to be attached to an insulator, a bus clamp formed in sections, bolts for connecting said sections over a bus to rigidly attach the clamp thereto, and means for hingedly supporting said clamp slidable longitudinally with the bus to said base plate.

5. The combination, a base plate, a pivotal support on said plate, a clamp for a bus adapted to be carried by said pivotal support, a second pivotal support removably secured to said base plate, a second clamp for a bus slidable longitudinally with the bus pivotally secured to said second support, to provide a bus support device for the ends of the bus on an insulator.

6. A bus support and electrical connection including, a plate member, a clamping device for the bus end hingedly supported to said plate member, and a detachable connection for a second connector to provide a slidable hinging expansion and contraction connection for bus ends and electrical switches.

7. A bus support including, a base plate, pairs of ears extending therefrom, bus bars, pivotal connecting means between one of said pairs of ears and one of said bus bars, a pivotal and slidable connection between the other of said bus bars and the other of said pairs of ears, and a flexible electrical connector connecting said bus bars.

8. A bus support including, a base plate, bus bars, pivotal connecting means between one of said bus bars and said base plate, a pivotal and slidable connection between the other of said bus bars and said base plate, and a flexible electrical connector connecting said bus bars.

ELIAS S. CORNELL.
MANFRED STENE.